Nov. 23, 1954   DE MONT G. MILLER ET AL   2,694,853
APPARATUS FOR REMOVING PROTECTORS FROM PIPE
Filed Sept. 18, 1950   7 Sheets-Sheet 4

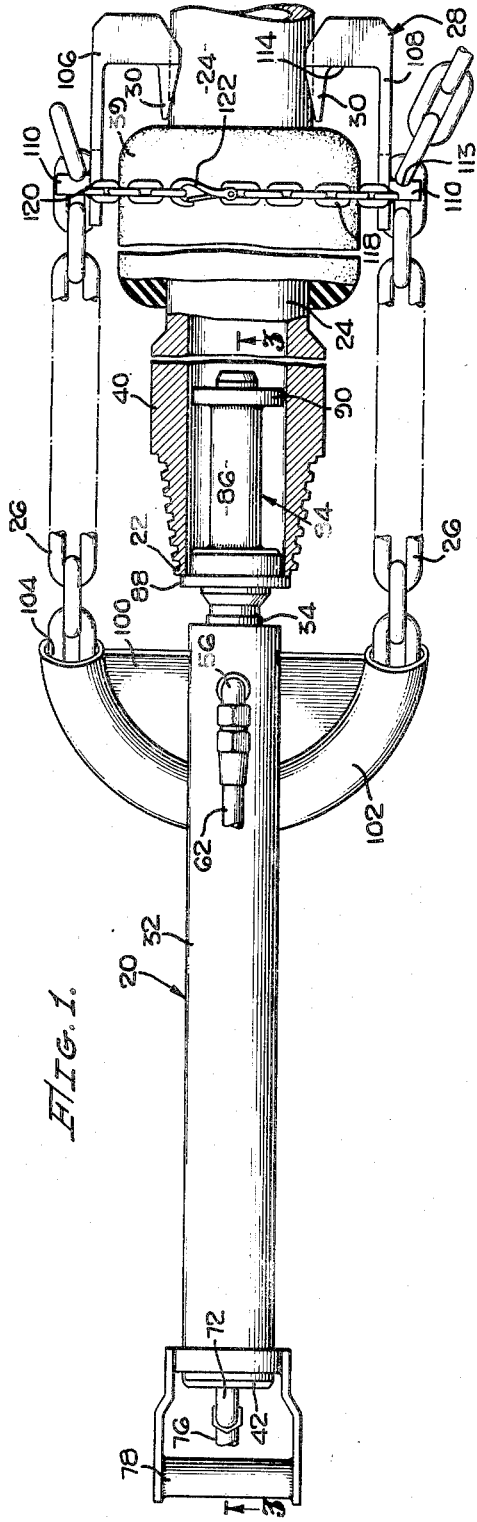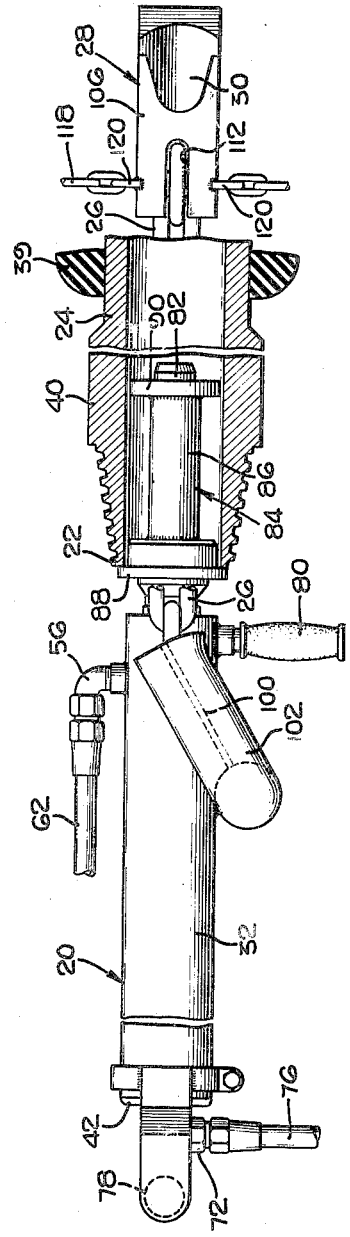

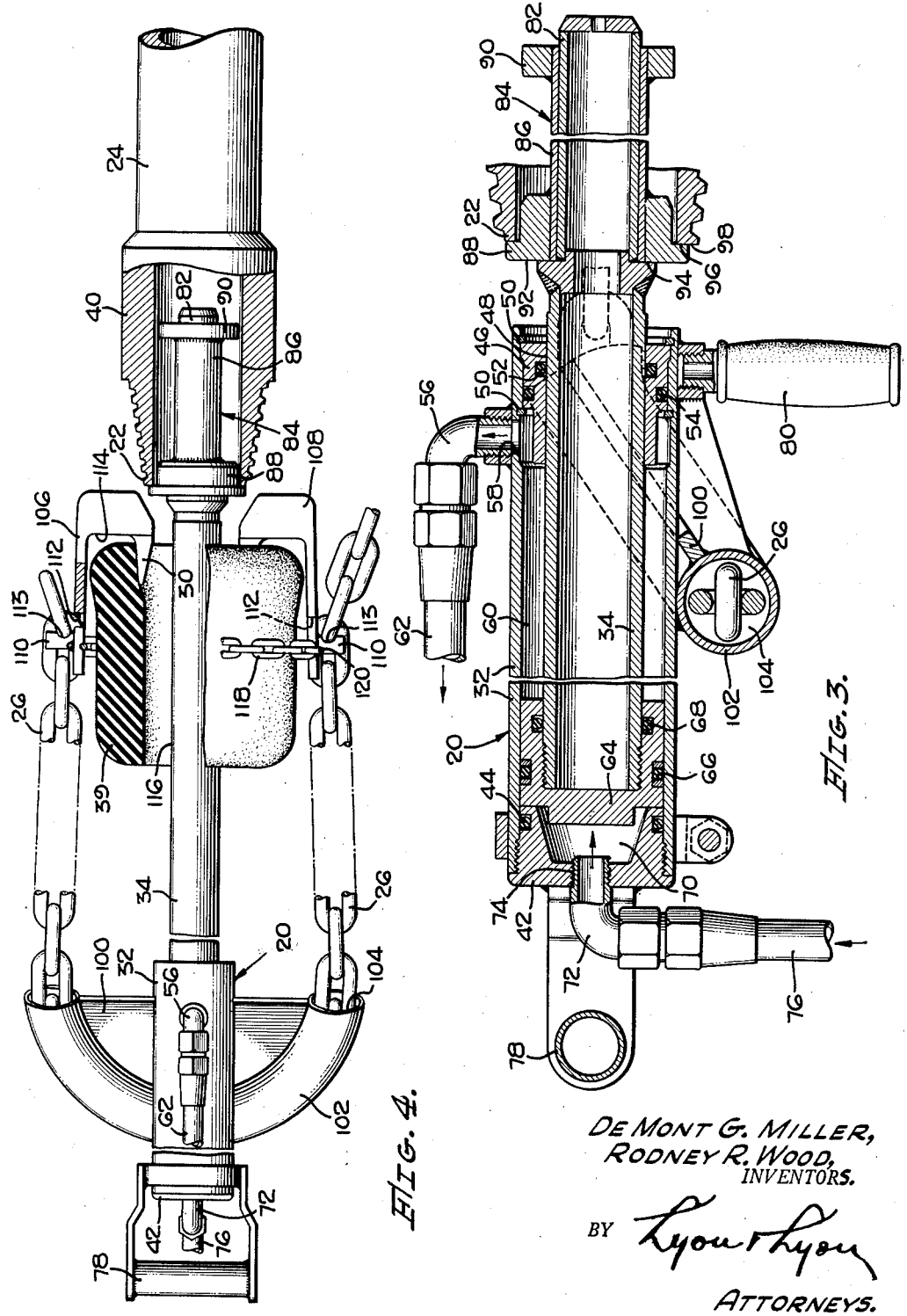

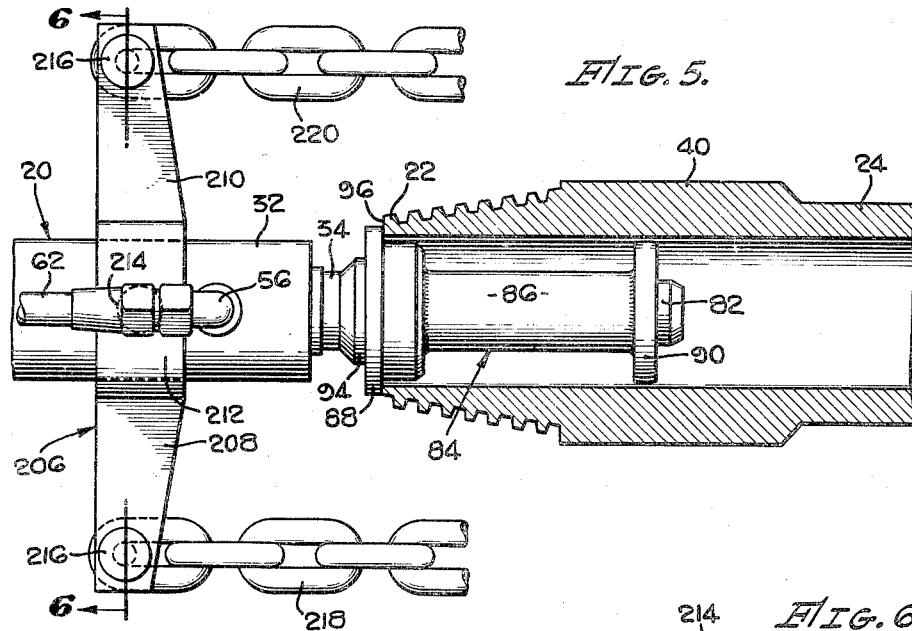
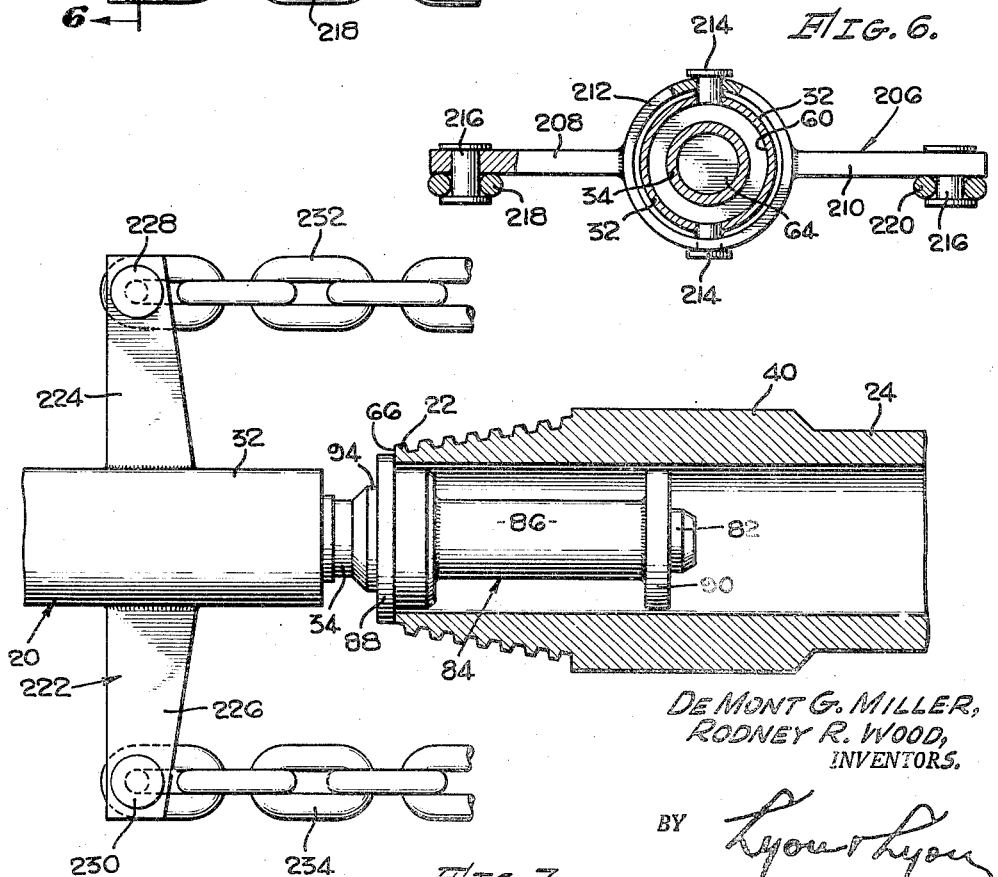

DE MONT G. MILLER,
RODNEY R. WOOD,
INVENTORS.

BY Lyon & Lyon
ATTORNEYS.

Nov. 23, 1954   DE MONT G. MILLER ET AL   2,694,853
APPARATUS FOR REMOVING PROTECTORS FROM PIPE
Filed Sept. 18, 1950   7 Sheets-Sheet 5

DE MONT G. MILLER,
RODNEY R. WOOD,
INVENTORS.

BY Lyon & Lyon
ATTORNEYS.

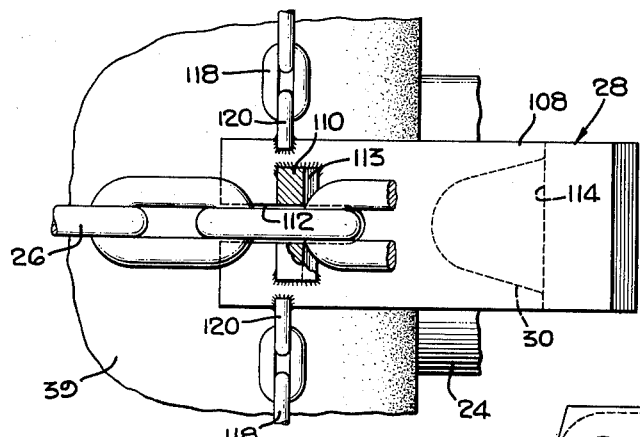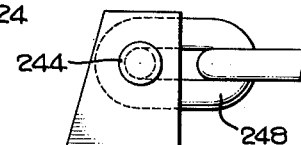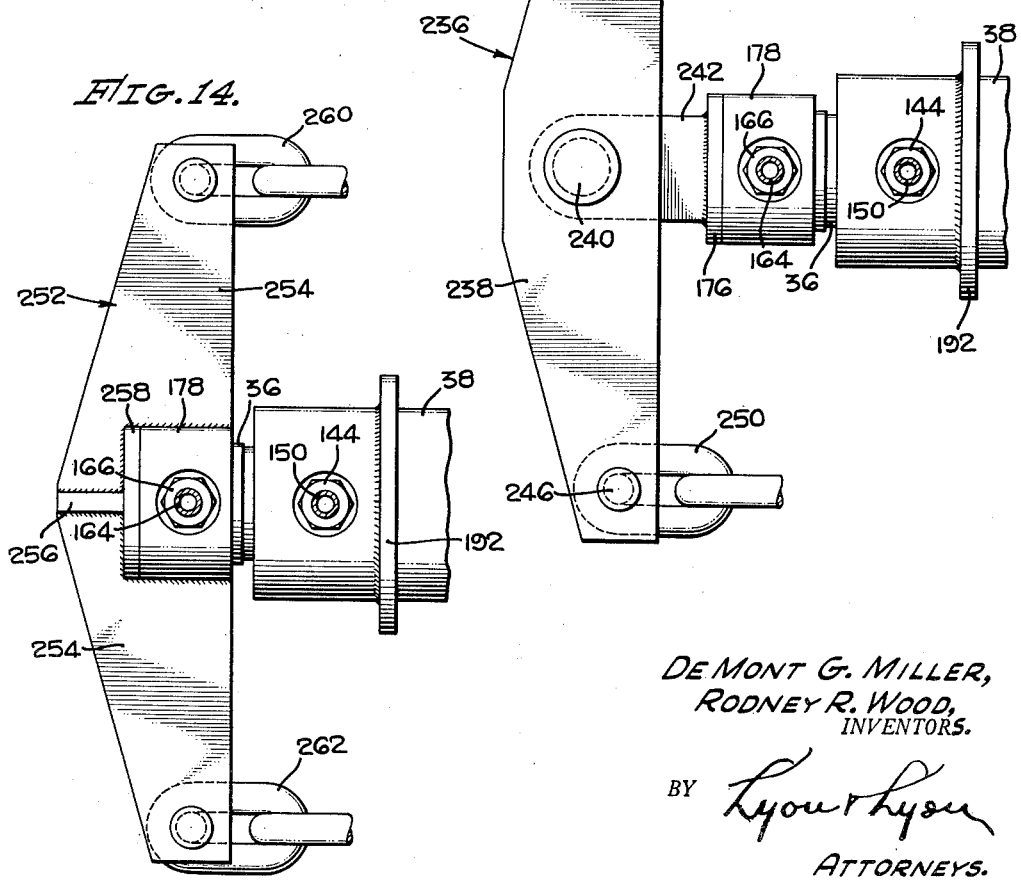

Nov. 23, 1954   DE MONT G. MILLER ET AL   2,694,853
APPARATUS FOR REMOVING PROTECTORS FROM PIPE
Filed Sept. 18, 1950                                7 Sheets-Sheet 7
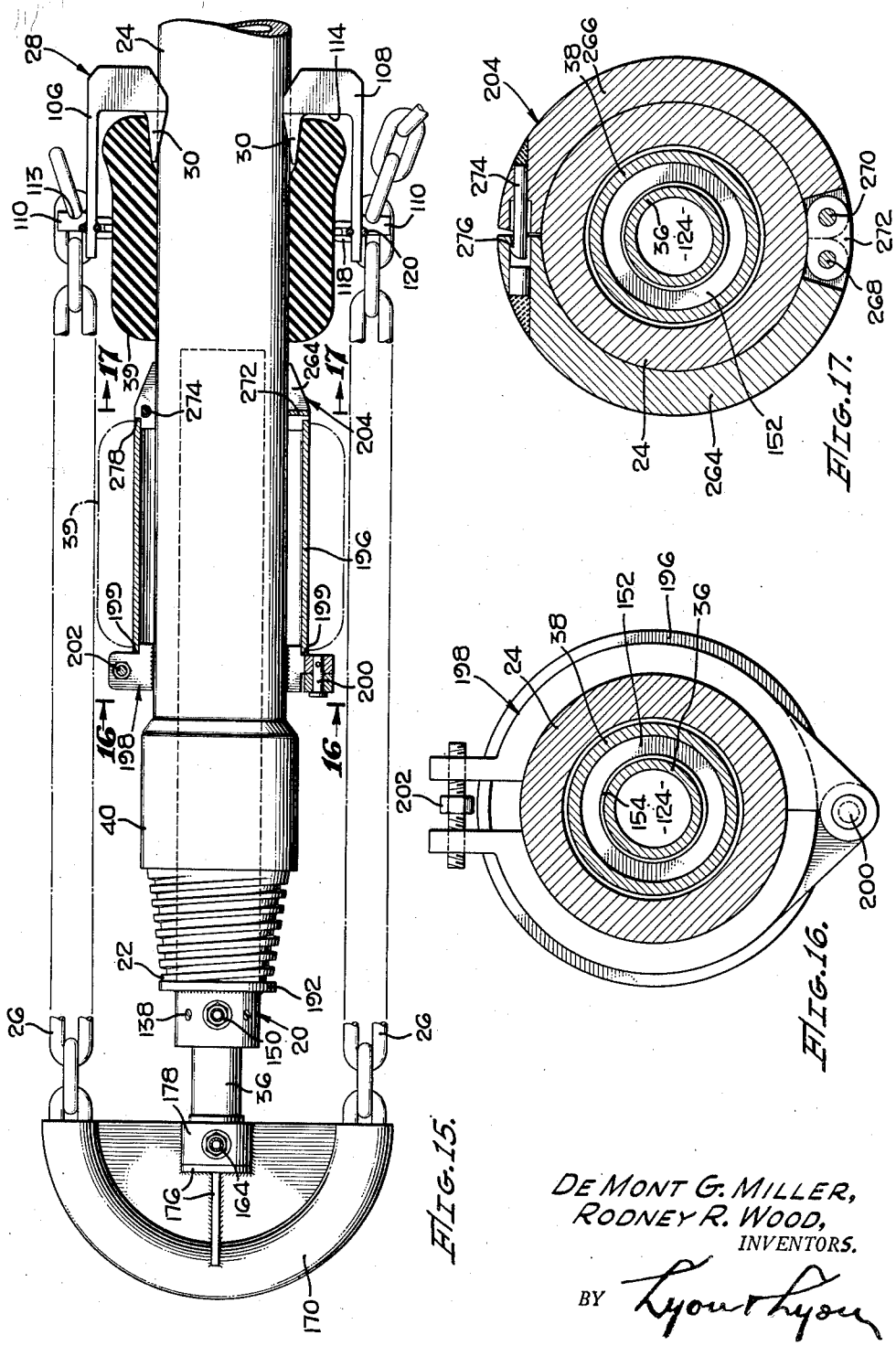
DE MONT G. MILLER,
RODNEY R. WOOD,
INVENTORS.
BY Lyon & Lyon
ATTORNEYS.

United States Patent Office 2,694,853
Patented Nov. 23, 1954

2,694,853

APPARATUS FOR REMOVING PROTECTORS FROM PIPE

De Mont G. Miller, San Marino, and Rodney R. Wood, Burbank, Calif., assignors to Byron Jackson Co., Vernon, Calif., a corporation of Delaware Application September 18, 1950, Serial No. 185,466

7 Claims. (Cl. 29—236)

This invention relates generally to well drilling equipment and more particularly to apparatus for removing protectors from drill pipe.

In the drilling of wells by the rotary method, one of the ever-present problems is that of wear on the drill pipe and on the inner wall of the casing installed in the well, such wear being occasioned by likely contact between said drill pipe and casing. Hence, it is common practice in the rotary drilling art to apply to the string of drill pipe numerous resilient protectors. Such protectors are usually composed of rubber or rubber-like material and are spaced at proper intervals upon the string of drill pipe to prevent contact of the drill pipe and particularly of the tool joints thereof with the casing.

These protectors ordinarily comprise cylinders which when installed thereon encompass the pipe. In order that they may tightly grip the pipe and thereby prevent slippage, the protectors are molded with their internal diameters smaller than the external diameter of the pipe and are thus difficult to remove from the drill pipe over the tool joint without damage when such removal is desirable. After a protector-equipped string of drill pipe has been used in drilling a well the protectors are usually but slightly worn and therefore re-usable in the drilling of another well. If such pipe string is to be used shortly thereafter to drill a second well, the protectors mounted thereon may safely remain on the pipe. If, however, such pipe is not to be used for some time it is preferable that the protectors be removed therefrom and placed in protective storage. Such storage will avoid damage to the protectors resulting from exposure to the elements while under tension upon the pipe, the pipe usually being stored in open unprotected racks when not in use.

Heretofore, several devices have been suggested for removing protectors from drill pipe. Generally, such devices comprise a base member adapted to be secured to the floor of a derrick and having upwardly extending arms. The upper end of the arms includes hooks or other means for engaging a pipe-mounted protector. For the removal operation the pipe is suspended in the derrick adjacent the device and the protector-engaging means are connected to the upper end of a protector to be removed from the pipe. The pipe is then elevated whereby the protector is pulled off over the bottom end thereof. Such devices have proven fairly satisfactory, but inasmuch as they require the use of the derrick equipment and the drilling crew, the usual drilling operations must necessarily be delayed during the protector removing process and thus considerable added expense occasioned. Furthermore, a considerable number of protectors are ordinarily torn in removal with this type of device, since the pipe is not always elevated at that angle which permits the protector-engaging means to exert a uniformly distributed removal force upon the upper end of the protector. Additionally, the use of these prior devices involves an appreciable risk to certain members of the drilling crew who are required to be stationed below the suspended length of drill pipe during the protector removing operation. Thus, any failure of the hoisting mechanism or miscalculation or carelessness of the operator thereof can easily result in serious injury to the crew members.

The present invention provides a novel power-operated apparatus for removing protectors from pipe, which apparatus overcomes the aforementioned disadvantages and which is effective, compact, easy to handle and yet positive in operation. It is therefore the principal object of this invention to provide protector removing apparatus independent of the derrick, whereby the protector removing process may take place after the drill pipe has been removed from the immediate vicinity of the derrick floor.

It is another object of this invention to provide apparatus for removing protectors from pipe which is safe in operation and which does not require the operator thereof to be positioned in a place of danger.

Yet another object of this invention is to provide a novel pipe-engaging means adapted for connection with the aforementioned protector-engaging means and relatively movable with respect to said pipe to draw the protector therefrom.

A further object of this invention is to provide means incorporating cooperative inter-relation between said pipe-engaging means and said protector-engaging means, whereby a substantially uniformly distributed removal force may be exerted, thus minimizing the likelihood of tearing such protector during removal.

A further object of this invention is to provide means particularly adaptable with the aforesaid means to enable transfer of the protector from the pipe to a transfer sleeve whereby removal of the protector over the tool joint and the rough threads thereof may be avoided.

Other objects and advantages of the present invention will be apparent from the following detailed description, taken in conjunction with the accompanying drawings wherein:

Figure 1 is a top view of protector removing apparatus embodying the present invention in engagement with the end portion of a drill pipe and in position to remove a protector mounted upon the pipe.

Figure 2 is a side elevational view thereof.

Figure 3 is a longitudinal sectional view of the apparatus taken on line 3—3 of Figure 1.

Figure 4 is a top view of the apparatus of Figures 1, 2 and 3 shown at the completion of the protector removing operation.

Figure 5 is a fragmentary top view of a modification of the apparatus shown in the preceding figures.

Figure 6 is a partial cross-sectional view of said modification taken on the line 6—6 of Figure 5.

Figure 7 is a fragmentary top view of another modification of the apparatus shown in the preceding figures.

Figure 12 is an enlarged fragmentary side elevational view partly in section of interconnecting means between the pipe-engaging means and the protector-engaging means.

Figure 13 is a fragmentary top view of the modification of the apparatus shown in Figures 8 through 11, inclusive.

Figure 14 is a fragmentary top view of another modification of the apparatus shown in said figures.

Figure 15 is a top view of means adapted for association with the foregoing apparatus whereby the protector may be removed from the pipe directly to a transfer sleeve.

Figure 16 is a cross-sectional view of the foregoing apparatus and means taken on the line 16—16 of Figure 15.

Figure 17 is a cross-sectional view thereof taken on the line 17—17 of Figure 15.

Figure 8:
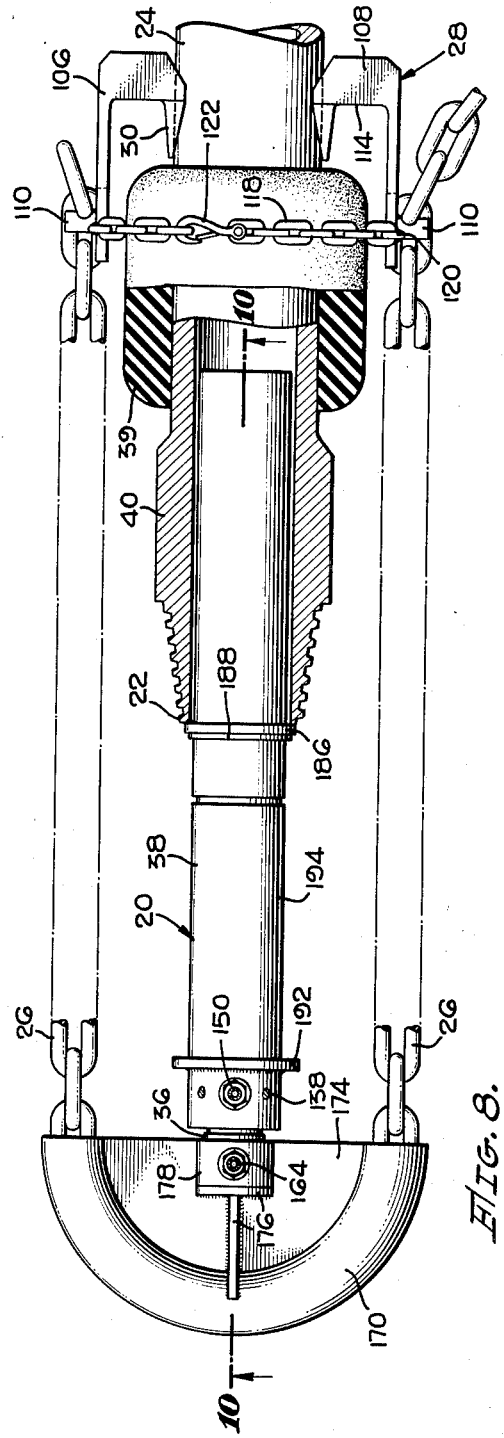
Figure 8 is a top view of another form of protector removing apparatus embodying the present invention.
Figure 9:
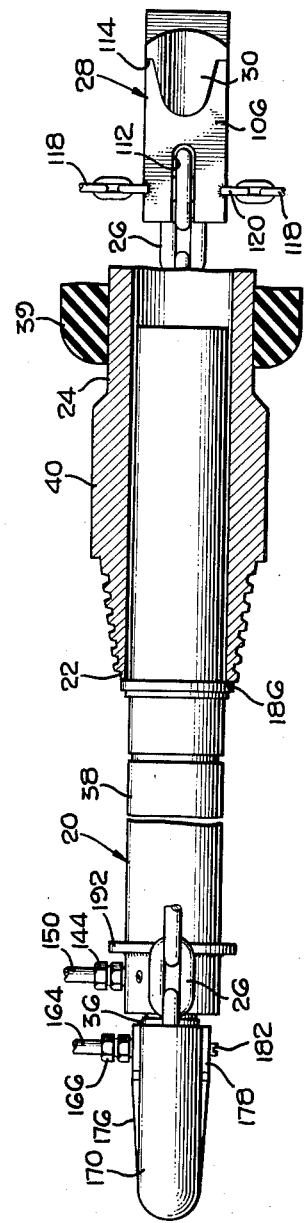
Figure 9 is a side elevational view thereof.
Figure 10:
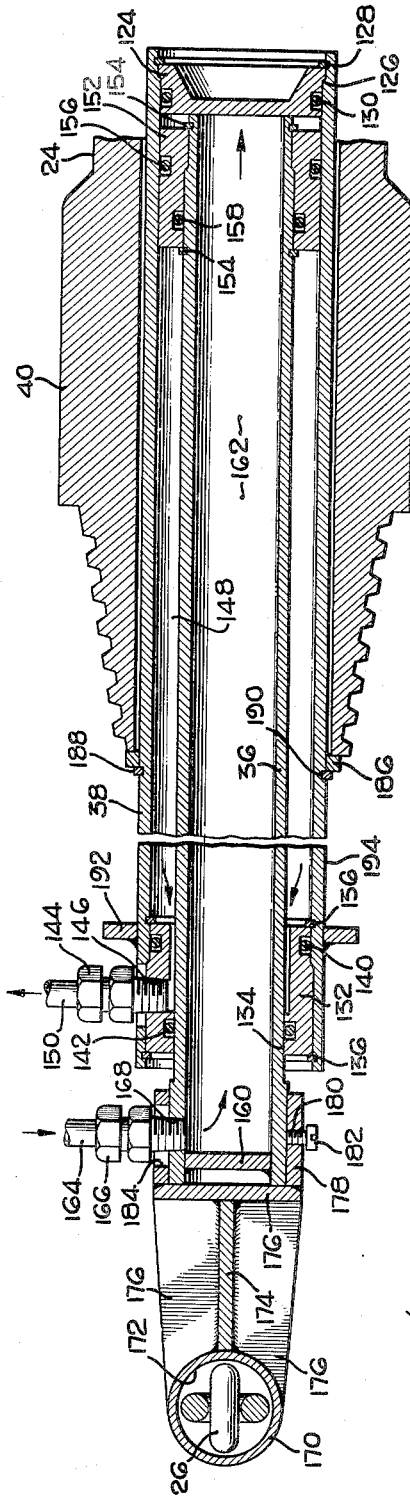
Figure 10 is a longitudinal sectional view of the apparatus of Figures 8 and 9 taken on the line 10—10 of Figure 8.
Figure 11:
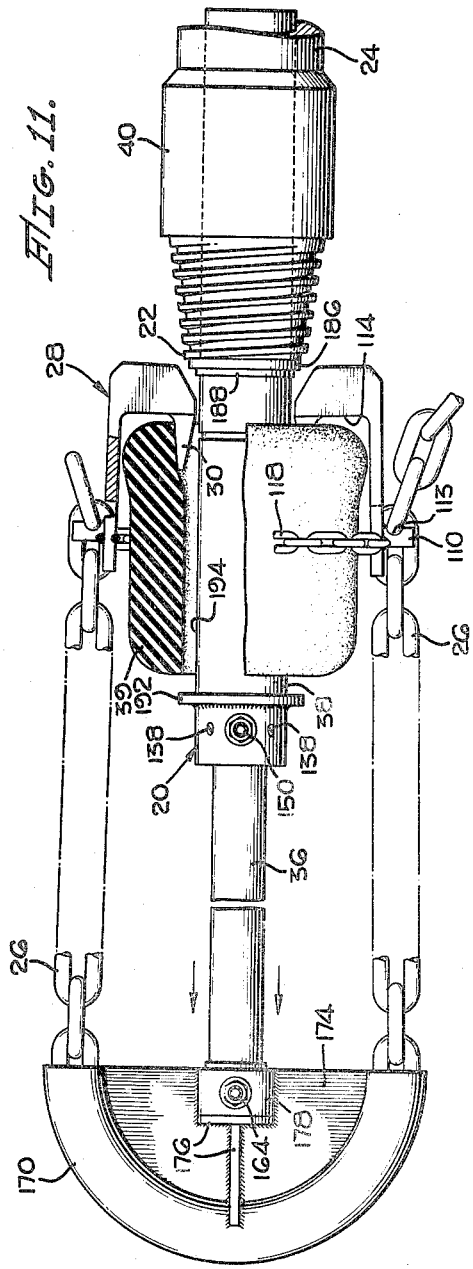
Figure 11 is a top view of the apparatus of Figures 8, 9 and 10 at the completion of the protector removing operation.

Referring to the drawings, and particularly Figures 1 to 4, inclusive, and 8 to 11, inclusive, it will be seen that the invention in its general aspect comprises a pipe-engaging means 20 abuttable against the extremity 22 of the drill pipe 24 and connecting means including tension members 26 connected to the said pipe-engaging means 20, said tension members being adaptable for connection to protector-engaging means 28, which may consist of the common hooks 30 or similar elements. The pipe-engaging means may consist, as in Figures 1 through 4, of a cylinder 32 slidable on a plunger 34, which plunger abuts the pipe or may consist, as in Figures 8 through 12, of a plunger 36 slidable in a cylinder 38, which cylinder abuts the pipe. As shown in the aforesaid figures, the connection between the tension members 26 and the pipe-engaging means is such that upon relative movement between cylinder and plunger, the force transmitted to the protector-engaging means is substantially uniformly distributed about the periphery of the protector. In operation after connection of the tension elements with the protector-engaging device, fluid pressure is admitted into the cylinder, relative movement caused thereby between cylinder and plunger, force transmitted to the protector-engaging means by the tension elements 26, and the protector 39 drawn from the drill pipe 24 over the tool joint 40 to the removed position shown in Figures 4 and 11.

More particularly, the embodiment shown in Figures 1 through 5 includes the cylinder 32 closed at one end by a plug 42 threaded thereto and sealed to the inner cylinder wall by an O-ring 44. The opposite end of the cylinder mounts a closure sleeve 46 having a central bore 48 wherein is slidably supported the plunger 34. This closure sleeve is secured by a pair of snap rings 50 and is sealed to the inner cylinder wall by an O-ring 52 and to the outer plunger surface by a second O-ring 54. A fluid fitting 56 is shown rigidly secured, as by welding, to the cylinder adjacent the closure sleeve 46. A bore 58 is formed in the wall of the cylinder so as to connect the annular pressure chamber 60 formed between the outer plunger surface and the inner cylinder surface with the fitting 56, and a conduit 62 communicating with a source of fluid pressure, not shown.

The plunger 34 has a closed piston 64 threadedly mounted at one of its ends. This piston is sealed to the inner surface by an O-ring 66 and to the outer plunger surface by a second O-ring 68, whereby is defined a second pressure chamber 70. The introduction of fluid pressure within this chamber 70 through a fitting 72 rigidly secured within a bore 74 formed in the plug 42 serves to urge the cylinder 32 away from the extremity 22 of the drill pipe when the plunger 34 abuts the said drill pipe extremity. The fitting 72 is connected to a conduit 76 communicating with a source of fluid pressure, not shown. To facilitate the handling thereof, the cylinder 32 is preferably fitted with one or more handles, such as the handle 78 shown at the closed end of said cylinder and the second handle 80 shown at its other end.

The exposed end of the plunger 34 is shown rigidly secured, as by welding, to one end of a cylindrical adapter mount 82. The adapter 84 comprises a sleeve 86 to which are rigidly secured, as by welding, an abutment ring 88 at one of its ends and an alignment ring 90 at its other end. The sleeve 86 is adapted to be concentrically disposed upon the adapter mount 82, at which time the end surface 92 of the ring 88 will shoulder upon an abutment surface 94 formed on the adapter mount. In operation, of course, when the adapter mount with an adapter mounted thereon is inserted within the end portion of the pipe 24, the abutment surface 96 formed upon the ring 88 of the adapter will engage the end surface 98 of the pipe. It will be obvious that the adapter assembly as above-described may be dispensed with and the end of the plunger 34 so conformed as to provide its own shouldered abutment surface for the end of the pipe 24. On the other hand, so that a single apparatus may be utilized with various sizes of pipe, the assembly hereinabove described may be provided with several adapters each having different sized rings 88 and 90 to accommodate different sized pipe.

Shown rigidly secured to a flat web 100, which is in turn rigidly secured to the cylinder 32, is an equalizing yoke 102; such equalizing yoke 102 comprising an arcuate tubular member wherein is formed a passage 104 which receives the tension element or chain 26. As shown, the plane of the passage 104 is inclined from the axis of the cylinder 32 in order to permit the passage to clear the said cylinder and at the same time permit the extremities of such passage to be in the axial plane of the said cylinder without unduly lengthening the necessary length of the chain 26. The chain 26, as has been hereinbefore generally described, connects with the protector-engaging means 28, the details of such connection and protector-engaging means being hereinafter set forth. It should be noted at this point that the yoke 102 may take other forms than shown in Figures 1 through 4, and examples of other suitable yokes will be set forth hereinafter.

The yoke passage 104 is preferably circular in cross-section and should be of sufficient diameter to permit the chain 26 to slide freely therein, the yoke and chain thus cooperating in this embodiment to act as a tension-equalizing means for the two hook-shaped dogs 106 and 108, which carry the hooks 30 to engage the protector 39. As shown particularly by Figure 12, each of the hook-shaped dogs is provided with a lug 110, such lug and the portion of the dog adjacent the lug having a slot 112 to permit detachable connection of the chain to the dog. A groove 113 is provided in the lug to accommodate the chain link configuration. Thus, upon axial movement of the cylinder 32 and hence the yoke 102 away from the end of the pipe 24, the dogs 106 by virtue of their connection to the yoke by the chain 26 will be urged toward the protector. Continued movement of the yoke in this direction will cause the hooks 30 to insert between the protector 39 and the pipe until the abutment surface 114 of each of the dogs engages the lip of the protector. Thereafter, further movement of the dogs will be effective to pull the protector along the pipe over the tool joint section 40 and onto the protector-receiving portion 116 of the plunger 34. It will be appreciated that whereas the hook-shaped dogs 30 are here shown as acting in conjunction with the apparatus as shown, other protector-engaging means connectible with the tension elements 26 may be used. For example, a particular protector-engaging means found very effective in conjunction with the present apparatus is shown in a copending application for United States Letters Patent, entitled "Protector Removing Device," Serial No. 185,468, filed September 18, 1950, by Raymond G. Taylor, Jr.

It should be observed that by reason of the freedom of sliding movement of the chain 26 within the yoke passage 104, the tension in each end portion of the chain extending between the yoke and the respective dogs 106 and 108 is equalized. Hence, if during a protector-removing operation unequal resistance to sliding develops in any one certain portion of the periphery of the protector, each dog will continue to exert a substantially equal removal force upon the protector. The provision of such tension-equalizing means reduces considerably the possibility of tearing a protector by the application of an excessive amount of force at a single point on the periphery thereof.

Preferably, the two dogs 106 and 108 will be connected by a safety chain 118 secured to eye members 120 which are rigidly affixed, as by welding, to each dog. This chain is adapted to prevent one or both of the dogs from flying outwardly with great force and possibly causing the injury of an operator in the event of one of the dogs becoming detached from the protector during the removal operation. Upon such a protector failure, the chain 118 acts as a dampening means to absorb much of the energy released by one or both of the suddenly released dogs and the attached length of chain 26. A snap element 122 may be provided to permit the chain 118 to be temporarily broken for more convenient application of the dogs to the protector. The provision of the chain 118 also facilitates the manual manipulation of the dogs during their application to the protector.

After the cylinder 32 and plunger 34 have been co-axially aligned with the pipe 24, the adapter 84 or the shouldered extremity of the plunger 34, as the case may be, is inserted within the pipe end and the pair of dogs 106 and 108 engaged with the protector in such manner that substantially no slack exists in the chain 148. Avoidance of slack in said chain may be accomplished by the interconnecting of one end of the chain 26 with, for example, the dog 106 by drawing the slack in the chain through the passage 104 and by interconnecting at the proper place an intermediate portion of the chain with the other dog 108. Next, fluid under pressure is admitted to the pressure chamber, so as to urge the cylinder away from the pipe extremity whereby the protector will be pulled over the tool joint 40 and onto the now exposed plunger. The protector may then be removed from the plunger and finally fluid pressure admitted to pressure chamber 60 through fitting 56 and exhausted from pressure chamber 70 through fitting 72, so as to return the cylinder and plunger to their original relative positions.

It will be further noted that if each protector to be removed is positioned adjacent the tool joint section 40 of the pipe at approximately the same distance from the end of the pipe, as shown in the drawings, it will not be found necessary to alter the distance between the dogs and the yoke. Frequently, however, a protector will have slipped along the pipe to a position farther removed from its end. Accordingly, the chain 26 should have sufficient length to reach these axially displaced protectors. As described above, both dogs may be engaged with the protector and the length of chain therebetween extended and the loose end re-attached to the free dog. The apparatus may then be actuated to produce a removal stroke. Ordinarily, a single stroke will not be sufficient, and hence the chain will have to be again detached from one of the dogs, the slack removed from the chain and the chain re-attached to the dog for a second removal stroke. This procedure may be repeated as many times as required in order to finally pull the protector off the pipe. The provision of a single length of chain freely slidable in the yoke passage 104 obviates the necessity of detaching the chain from both dogs in order to remove the slack preparatory to a repetition of the operation.

Referring now to Figures 5 and 6, there is shown a modified form of yoke which may be used with the aforedescribed cylinder and plunger apparatus in place of the yoke 102 shown in Figures 1 through 4. The yoke, generally designated 206, comprises two cross-arms 208 and 210 affixed by welding to a pivot collar 212, said pivot collar being pivotable on pins 214 which are welded to the cylinder 32, the inner diameter of such collar being sufficiently spaced from the outer diameter of the cylinder 32 to permit a certain pivot travel by the said collar 212. The cross-arms 208 and 210 are each bored adjacent its end to receive attachment pins 216 which receive the end links of chains 218 and 220, the said chains 218 and 220 replacing the chain 26 and being each connected to the hook-shaped dogs in the manner described previously. It will be appreciated that the aforedescribed pivoting yoke and the two lengths of chain 218 and 220 cooperatively function as a tension-equalizing means for the hook-shaped dogs 106 and 108.

Again referring to Figure 7, there is shown another modified form of yoke which may be used with the aforedescribed apparatus. The yoke, generally designated 222, comprises cross-arms 224 and 226 which are rigidly connected, as by welding, to the cylinder 32. Each of the said cross-arms is bored to receive the attachment pins 228 and 230 which in turn serve to connect the end links of the chains 232 and 234. Chains 232 and 234 may be connected to the hook-shaped dogs 106 and 108 in the same manner as the chains 218 and 220. This yoke is simpler and less expensive to construct than either of the yokes described previously, but it does not serve as a tension-equalizing means. Again, it will be noted that with both the modifications of Figures 5 and 6 and Figure 7 it is necessary, when varying the axial distance between the yoke and the protector to be removed, to detach both lengths of chain from the dogs, rather than merely detach but one end as with the yoke assembly of Figures 1 through 4.

Referring now to Figures 8 to 11, inclusive, which illustrate a modified form of protector-removing apparatus embodying the present invention, it will be seen the cylinder 38 is closed at one end by a plug 124 held against a shoulder 126 formed on the cylinder by a snap ring 128, which plug is sealed to the inner wall of the cylinder by an O-ring 130. The opposite end of the cylinder mounts a closure sleeve 132 having a central bore 134, wherein is slidably supported the plunger 36. The closure sleeve is secured by a pair of snap rings 136 and one or more set screws 138, and is sealed to the inner cylinder wall by an O-ring 140 and to the outer plunger surface by a second O-ring 142. A fluid fitting 144 is shown threadedly secured within a transverse bore 146 formed in closure sleeve 132, which fitting serves to connect the annular pressure chamber 148 formed between the cylinder and the plunger with a conduit 150 communicating with a source of fluid pressure, not shown. The plunger 36 has a headless annular piston 152 mounted at one of its ends by snap rings 154, this piston being sealed to the inner cylinder wall by an O-ring 156 and to the inner plunger surface by a second O-ring 158. The exposed end of the plunger is sealed by a plug 160 and the piston end of the plunger is open whereby the introduction of fluid pressure to pressure chamber 162 through a second conduit 164 and a fitting 166 will force the plunger axially outward with respect to the cylinder and away from the end of the pipe 24. The fitting 166 is shown threadedly secured within a transverse bore 168 formed in the plunger 36.

A yoke 170, comprising an arcuate tubular member similar to the yoke 102, is shown detachably mounted upon the exposed end of the plunger 36. There is formed in the yoke a passage 172 adapted to receive the chain 26, and the yoke is rigidly secured, as by welding, to a flat web 174 and reinforcement strips 176, which elements in turn are rigidly secured to a supporting sleeve 178. The support sleeve is adapted to be mounted upon the exposed end of the plunger and is formed with one or more transverse bores 180 wherein are threaded set screws 182. These set screws may be tightened against the outer surface of the plunger so as to maintain the yoke locked against rotation with respect to the plunger. It will be observed that with the arrangement shown the support sleeve 178 must be mounted upon the plunger before the fluid fitting 166 may be threaded within the plunger bore 168, a transverse bore 184 being formed in the sleeve to permit access thereto.

The cylinder 38 is provided with shoulder means in the form of a ring 186 to abut against the extremity 22 of the pipe 24. Such ring 186 is slidable on the cylinder 38 and anchorable thereon against axial movement by a snap ring 188 positioned in an annular groove 190 formed in the outer cylinder surface. A second ring 192 is rigidly secured upon the outer surface of the cylinder adjacent the fluid fitting 144, preferably by welding, and serves to protect fitting 144 and 166 and also to define with the ring 188 the protector-receiving section 194.

As with the embodiment shown in Figures 1 to 4, inclusive, the yoke passage 172 is preferably circular in cross-section, and should be of sufficient diameter to permit the chain 26 to slide freely therein. As with the foregoing embodiment, such chain 26 is connected to the two hook-shaped dogs 106 and 108 and will provide a tension-equalizing means to prevent excessive tension on either of the dogs which might result in injury to the protector.

The operation of the embodiment of Figures 8 to 11, inclusive, is similar to the operation of the embodiment of Figures 1 through 4. Initially, the cylinder 38 is axially inserted within the end portion of the pipe 24 until the shoulder ring 186 abuts the extremity 22 of the pipe. At this point, the plunger 36 should be positioned with its piston end adjacent the end of the cylinder nearest the protector. The hooks 30 of the dogs 106 and 108 should then be engaged with the lip of the protector, and the chain 26 interconnected with the said dogs, as previously described. Thereafter, fluid pressure may be admitted through fitting 166 to force the plunger axially outwardly with respect to the cylinder and away from the end of the pipe whereby the protector will be pulled over the tool joint 40 and onto the protector-receiving section 194 of the cylinder 38. The dogs may then be disengaged from the protector and fluid pressure admitted through fitting 144 and exhausted through fitting 166 to return the plunger to its original position. The apparatus may then be withdrawn from the pipe and the protector slipped axially over the inner end of the cylinder.

Referring now to the modification of Figure 13, there is shown a modified form of yoke which may be used with the apparatus of Figures 8 through 11 in place of the yoke 170. The yoke, generally designated 236, comprises a cross-arm 238 pivotally supported at its mid-portion upon a pivot pin 240 carried by a pivot mount 242 rigidly secured, as by welding, to the support sleeve 178. The cross-arm 238 is bored adjacent each of its ends to receive attachment pins 244 and 246 for the end links of the chains 248 and 250. These chains, of course, are adapted to be connected to the protector-engaging means and the pivotally mounted cross-arm 238 and the two lengths of chain cooperatively function as a tension-equalizing means similar to that provided by the yoke 170 and chain 26.

Referring to Figure 14, there is shown another yoke embodiment 252, consisting of a cross-arm 254 having ribs 256 and 258 mounted to the support sleeve 178 rigidly, as by welding. Each end of the cross-arm 254 is provided with similar attachment means for the chains 260 and 262, which chains are connected to the protector-engaging means. As with the embodiment of Figure 7, this yoke is simpler and less expensive to construct than the other yoke forms but does not serve as a tension equalizer.

Referring finally to the embodiment shown in Figures 15 to 17, inclusive, it will be seen that such embodiment contemplates the adaptation of a transfer sleeve means to the aforedescribed apparatus. Such means consists of a sleeve 196 of sufficient inside diameter to be readily slipped over the tool joint 40 to a position adjacent the protector 39. To anchor the sleeve in position, there is provided at its rear portion a split hinged clamp 198, such clamp being pivotable about the axis of a pin 200, which pin secures the two edges of the clamp together at one side of the pipe. A bolt 202 is provided at the opposite ends of the two halves whereby said halves may be tightened or loosened with respect to the pipe. Such clamp 198 tightened over the pipe 24 is provided with a shoulder or seat 199 against which may bear the said sleeve 196. At the opposite end of the sleeve 196 is provided a tapered split and hinged sleeve 204. Such tapered sleeve is provided with two sections 264 and 266 pivotally mounted by the pins 268 and 270 to the link 272. A hook 274 is provided mounted in the section 266 to engage the recessed catch 276 in the section 264 in order that the tapered sleeve may be snapped about the pipe 24 to bear against the sleeve 196. A peripheral shoulder 278 is provided on the tapered sleeve 204 to receive the extremity of the said transfer sleeve.

The operation of the transfer sleeve means in conjunction with the protector-removing apparatus comprises sliding the protector toward the tool joint 40, as previously described, but in this instance the protector rides up the tapered sleeve 204 onto the transfer sleeve 196 whereupon the dogs 106 and 108 may be removed from the protector, the apparatus removed from adjacent the pipe and the protector-bearing transfer sleeve itself removed from the pipe after release of the tapered sleeve 204 and the clamp 198. The protector may be transferred from the transfer sleeve to another pipe in common manner, or stored for subsequent use either on the transfer sleeve or after removal therefrom. It is, of course obvious that the various embodiments of the protector-removing apparatus previously described may all be used with the foregoing transfer sleeve means.

It will be apparent to those skilled in the art that various other modifications and changes may be made without departing from the essence of the instant invention, and it is intended to cover herein all such modifications and changes as are within the true spirit and scope of the appended claims.

We claim:

1. Apparatus for removing a protector from pipe comprising: a stationary member abuttable against an end of a pipe; a movable member in telescopic movable relationship with said stationary member, a yoke carried by said movable member, said yoke defining an arcuate passage; a flexible tension member threadable through said arcuate passage and freely slidable therein, means secured to the opposite ends of said tension member for engaging the side of a protector remote from said pipe end, and fluid pressure means for applying pressure between said stationary and movable members to relatively move said members axially.

2. Apparatus as defined in claim 1 wherein said tension member comprises a chain.

3. Apparatus as set forth in claim 1 wherein said yoke is secured to one side of said movable member and extends about the periphery and on each side thereof to locate the extremities of said arcuate passage in substantially the same plane with the movable member.

4. Apparatus for removing a protector from pipe comprising: a stationary member having a shoulder engageable with a cooperating shoulder on the end of a pipe and having an aligned element insertable into said pipe end to maintain said stationary member and said pipe co-axially rigid; a movable member in telescopic movable relationship with said stationary member, a yoke carried by said movable member, said yoke defining an arcuate passage; a flexible tension member threadable through said arcuate passage and freely slidable therein, means secured to the opposite ends of said tension member for engaging the side of a protector remote from said pipe end, and means for applying pressure between said stationary and movable members to relatively move said members axially.

5. Apparatus for removing protectors from pipe, comprising: a stationary member having a portion for abutting the end of a pipe, a movable member in telescopic relationship with said stationary member and movable away from said pipe abutting portion, means for engaging the side of a protector remote from said pipe end, connecting means having ends attached to said protector engaging means and having portions extending on opposite sides of said movable member, an equalizing yoke carried by said movable member and having extremities on opposite sides of said movable member engaging said portions of said connection means to permit said portions to be moved axially with respect to one another to equalize tensions in said connecting means, and means for applying pressure between said stationary and movable members to relatively move said members and to move said movable member away from a pipe engaging said pipe engaging portion and to move a protector along such pipe.

6. An apparatus as set forth in claim 5 in which the yoke comprises an arm pivotally mounted on said movable member and having its ends attached to said portions of said connecting means.

7. An apparatus as set forth in claim 6 wherein said connecting means comprises chains connected to said protector engaging means and to the ends of said arm.

References Cited in the file of this patent

UNITED STATES PATENTS

| Number | Name | Date |
|---|---|---|
| 942,410 | Peterson | Dec. 7, 1909 |
| 1,344,510 | Hilliard | June 22, 1920 |
| 1,494,564 | Piasecki | May 20, 1924 |
| 1,688,535 | Ellis et al. | Oct. 23, 1928 |
| 2,165,504 | Pfauser | July 11, 1939 |
| 2,228,229 | Hall | Jan. 7, 1941 |
| 2,252,036 | Rummer | Aug. 12, 1941 |
| 2,327,088 | Barnes | Aug. 17, 1943 |
| 2,489,413 | Hink | Nov. 29, 1949 |

FOREIGN PATENTS

| Number | Country | Date |
|---|---|---|
| 11,203 | Great Britain | Mar. 4, 1909 |